United States Patent
Jaeger

(10) Patent No.: US 9,291,226 B2
(45) Date of Patent: Mar. 22, 2016

(54) DISK BRAKE, AND PRESSURE PLATE AND BRAKE PAD FOR SUCH A DISK BRAKE

(71) Applicant: WABCO Radbremsen GmbH, Mannheim (DE)

(72) Inventor: Hellmut Jaeger, Ludwigshafen (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 0 days.

(21) Appl. No.: 14/356,575

(22) PCT Filed: Nov. 8, 2012

(86) PCT No.: PCT/EP2012/004651
§ 371 (c)(1),
(2) Date: May 6, 2014

(87) PCT Pub. No.: WO2013/068120
PCT Pub. Date: May 16, 2013

(65) Prior Publication Data
US 2014/0311836 A1 Oct. 23, 2014

(30) Foreign Application Priority Data
Nov. 11, 2011 (DE) .......................... 10 2011 118 313

(51) Int. Cl.
*F16D 65/097* (2006.01)
*F16D 55/226* (2006.01)
*F16D 65/092* (2006.01)
(Continued)

(52) U.S. Cl.
CPC .......... *F16D 65/0971* (2013.01); *F16D 55/226* (2013.01); *F16D 65/092* (2013.01); *F16D 65/095* (2013.01); *F16D 2055/0008* (2013.01); *F16D 2055/0016* (2013.01); *F16D 2065/026* (2013.01)

(58) Field of Classification Search
CPC .............. F16D 65/092; F16D 65/0971; F16D 2065/1324; F16D 2055/0008; F16D 2055/0045; F16D 55/226; F16D 65/095
See application file for complete search history.

(56) References Cited

U.S. PATENT DOCUMENTS 3,580,361 A * 5/1971 Eggstein et al. ............. 188/72.4
4,240,530 A * 12/1980 Tillenburg ................ 188/250 E
(Continued)

FOREIGN PATENT DOCUMENTS

DE 102008019003 A1 10/2009
EP 0641949 A1 3/1995
(Continued)

OTHER PUBLICATIONS

International Preliminary Report on Patentability for PCT Application No. PCT/EP2012/004651, dated May 22, 2014, 8 pages.

*Primary Examiner* — Vishal Sahni
(74) *Attorney, Agent, or Firm* — Schwabe, Williamson & Wyatt, P.C.

(57) ABSTRACT

The invention relates to a disk brake, in particular for commercial vehicles, comprising a brake pad, a brake application device for pressing the brake pad against a brake disk, a pressure plate, by way of which the brake application device presses the brake pad against the brake disk during the braking process, and comprising an inclined guide, which during braking guides the pressure plate along a path located transversely to the brake axis. The pressure plate is provided with a protrusion, and the brake pad is provided with a recess, which accommodates the protrusion when assembled.

7 Claims, 3 Drawing Sheets

(51) Int. Cl.
*F16D 65/095* (2006.01)
*F16D 55/00* (2006.01)
*F16D 65/02* (2006.01)

(56) References Cited

U.S. PATENT DOCUMENTS

| | | | |
|---|---|---|---|
| 4,846,312 A * | 7/1989 | Sweetmore et al. | 188/73.1 |
| 2005/0173205 A1* | 8/2005 | Bach et al. | 188/72.5 |
| 2008/0029351 A1 | 2/2008 | Gruber et al. | |
| 2008/0264737 A1* | 10/2008 | Baumgartner | 188/72.4 |
| 2008/0271963 A1 | 11/2008 | Brunard | |
| 2009/0045018 A1* | 2/2009 | Baumgartner et al. | 188/72.2 |

FOREIGN PATENT DOCUMENTS

| | | | |
|---|---|---|---|
| EP | 1637759 A1 | | 3/2006 |
| GB | 2074261 A | | 10/1981 |
| JP | 55038014 | * | 3/1980 |
| JP | 10184744 | * | 7/1998 |

* cited by examiner

DISK BRAKE, AND PRESSURE PLATE AND BRAKE PAD FOR SUCH A DISK BRAKE

CROSS-REFERENCE TO RELATED APPLICATION

The present application is a 35 U.S.C. §371 national phase entry application of, and claims priority to, International Patent Application No. PCT/EP2012/004651, filed Nov. 8, 2012, which claims priority to German Patent Application No. DE 10 2011 118 313.6, filed Nov. 11, 2011, the disclosures of which are hereby incorporated by reference in their entirety for all purposes.

BACKGROUND

The invention concerns a disk brake, especially for commercial vehicles, with a brake pad, a brake application device for pressing the brake pad against a brake disk, a pressure plate by way of which the brake application device presses the brake pad against the brake disk during the braking process, and an inclined guide which guides the pressure plate along a path lying obliquely to the brake axis during the braking process.

Disk brakes of the aforementioned kind are known, for example, from EP 1 637 759 A1.

Such brakes can be activated pneumatically and/or electromechanically, for example. In this case, by means of a relatively small attack surface of the brake application device arranged in the brake caliper, a large force component is applied by at least one pressing spindle mechanism perpendicular to the plane of the brake disk against a large-surface brake pad, consisting of a pad support plate (back plate) and a friction lining attached thereto and contacting the brake disk in the braking process. In what follows, the invention is explained more closely by means of preferred sample embodiments making reference to the enclosed drawing with further details.

DETAILED DESCRIPTION

Figure 1:
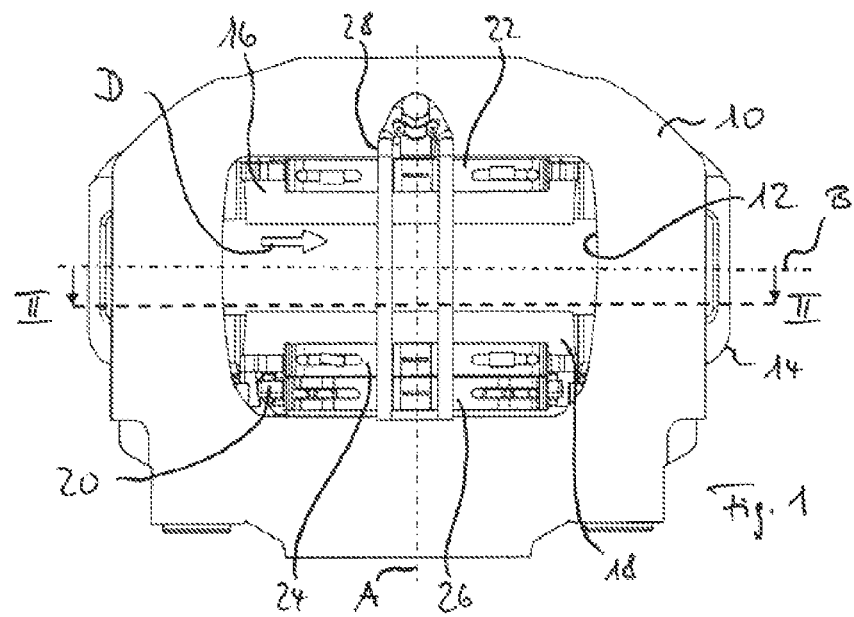
FIG. 1, a schematic top view of a disk brake according to one sample embodiment of the invention, FIG. 2, a sectional view along line II-II of FIG. 1, FIG. 3, a partial view of the brake of FIG. 1 at the application side, FIG. 4, the pressure plate of the brake of FIG. 1 and its guidance in the brake part, FIG. 5, an enlarged view of the part of the brake of FIG. 2 designated as "V", FIG. 6, a sectional view along line VI-VI of FIG. 5, FIG. 7, schematically, a pressure plate according to another sample embodiment of the invention, FIG. 8, the pressure plate of FIG. 7 with the corresponding brake pad situated in front of it, and FIG. 9, the same view as FIG. 2, but with the pressure plate and the brake pad according to FIGS. 7 and 8.

For reasons of economy (such as weight, material) and the narrow space available (for installation), the back plate is not excessively thick and rigid. In the brake according to the invention, a pressure plate or pressure distributing plate is used between the brake application device and the back plate. This pressure plate is appropriately rigid so that its contact surface, extending over approximately the surface of the back plate, ensures that the brake pad is pressed against the brake disk as uniformly as possible and free of deformation.

The invention pertains in particular to brakes in which both the brake pad and the pressure plate constitute separate parts and are installed in or removed from the brake radially through a brake caliper opening. This is done during new installation, during servicing as part of a brake inspection, and when replacing the pressure plate and/or brake pad. The pressure plate here is not wider than the brake pad.

The two aforementioned parts of brake pad and pressure plate are guided for example at the application side in a fixed brake support and/or in shaft openings in the brake caliper laterally and/or radially inward on the broadest possible contact surfaces and braced by these surfaces. The brake pad can be bounded in both directions by bracing horns.

The brake pad is often guided radially on contact surfaces situated on shoulders or on a connection yoke between the bracing horns. On the other hand, it is possible according to the invention to guide the pressure plate only radially on these contact surfaces, while in addition it engages by a lower lying shoulder (to prevent twisting) with a groove of the brake support or the brake caliper, producing a forced guidance. Thus, in this configuration, the pressure plate is "hanging". On the whole, there is a basically U-shaped shaft.

To accomplish the oblique guidance of the pressure plate, the aforementioned groove lies increasingly closer in the preferred direction of rotation of the brake disk in forward travel in the contact surface on the brake disk run-in side, and in addition the groove is inclined at an angle relative to the disk run-in. Thus, there is an oblique groove which serves to guide the pressure plate. The size of the respective angle depends on the installation situation.

Thus, during the braking process, an opposite relative movement of the application-side brake pad on the one hand and the pressure plate on the other. This serves to stabilize and even out the wear on the pad. The invention is especially applicable to disk brakes in which the brake pads and the pressure pads are clamped in the required position by means of hold-down springs and a hold-down element to prevent rattling noises and dropping out of the brake.

After a certain size of disk brake, especially in the case of commercial vehicle disk brakes, it is necessary to use brake pads of different quality or different dimensions according to the situation. This then also applies to the pressure plate.

Due to these different designs, mistakes cannot be ruled out, both in regard to the matching of parts and their installation. Thus, it can happen that brake pads with slightly different dimensions are installed during a servicing job in regard to the existing brake pad shafts, or installation items or installation sides are mixed up. There are also known cases where servicing intervals were not obeyed and then after falling below the permissible residual thickness of the brake disk or pad the brake pad was torn off into the free space between the brake disk and the shaft guide.

The problem of the invention is to modify the disk brakes of the above mentioned kind in terms of economy so that the operating and functional reliability and the servicing friendliness are improved with little design cost.

According to the invention, the problem is solved by a projection on the pressure plate and a recess in the brake pad which accommodates the projection in the assembled state.

In other words, the brake lining has a recess or cavity in which the projection of the pressure plate is inserted. This provides a coding of parts. It is based in particular on the pressure plate. Thus, the pressure plate only matches up with the corresponding brake pad.

According to the invention, a play is preferably present between a side boundary of the projection and the corresponding interior boundary of the recess. This ensures a relative displacement of the brake pad on the one hand and that of the pressure plate on the other hand with respect to each other in the direction parallel to the plane of the disk brake. In particular, on account of the oblique guidance of the pressure plate over the entire wearing distance of pad and disk, the width of the recess is sufficiently large to avoid any "contact collision" over the entire wearing distance. In other words, there is a lateral functional play in the recess.

According to one preferred embodiment of the invention, the depth of the recess corresponds at least to the thickness of a back plate of the brake pad. If the brake pad is further displaced on account of falling below the permissible residual thickness of brake pad/disk brake, it will continue to engage the projection and "hang", depending on the position of the disk and its direction of turning, so that it cannot be torn off into the free space between brake disk and shaft guidance.

According to another preferred embodiment of the invention, the projection lies in the radially inward region of the pressure plate and/or the recess lies in the radially inward region of the brake pad.

Because the brake pad is directly radially installed for example when the pressure plate has been installed and the projection does not need to be surrounded by the recess on all sides, no axial movements of the brake pad relative to the pressure plate are required to bring the two parts into contact against each other. This holds not only during installation, but also during removal.

Furthermore, with this configuration, only a negligible portion of the frictional surface is lost due to the recess. Furthermore, the projection and the recess lie in an approximately "force-neutral" region. If, instead, the projection or the recess was situated approximately in the middle region of the pressure plate or the brake pad, it would be at the center of the force application, for example, where a pressing spindle applies the braking force. This might result in material stresses and/or material cracks. Furthermore, the above-mentioned drawback of a form fitting would exist, making an installation difficult.

Again preferably, the projection according to the invention is made as a single piece with the pressure plate. This reduces the number of parts. Moreover, the installation and removal is especially easy.

Finally, it is especially preferable according to the invention that the pressure plate is a separate part.

Because the coding is based on the pressure plate and the brake pad, no additional work or special matching to the brake caliper and/or brake support is required. This is a substantial contribution to the economy.

It is expressly pointed out that the coding system of the invention does not require a recess in the form of a continuous opening. Instead, the recess can also have the form of a blind hole. Neither does it need to be bounded on all sides by side walls. Instead, the side walls can also form a U.

Besides the disk brake specified above, the invention also creates a pressure plate and a brake pad for such a disk brake.

The disk brake shown in the drawing according to one sample embodiment of the invention includes a caliper 10, which is a sliding caliper and which has a radial opening 12, a brake support 14, a brake pad 16 at the rim side, a brake pad 18 at the application side, a pressure plate 20, hold-down springs 22, 24, 26 for the brake pads 16 and 18 and for the pressure plate 20, respectively, and a hold-down stirrup 28 for the hold-down springs 22, 24, and 26.

Inside the lower part of the brake caliper 10 shown in FIG. 1 is a brake application device, not shown here. In the braking process, this presses against the pressure plate 20, which in turn presses the brake pad 18 against a disk brake, not shown in the drawing. The plane B of the disk brake is shown by broken line. The force of the reaction which occurs moves the brake caliper 10 downward in FIG. 1, which also presses the brake pad 16 against the brake disk. The brake application device also includes a pressing spindle mechanism, also not shown in the drawing, by means of which the brake can be adjusted to compensate for wear. The preferred direction of rotation of the brake disk when driving forward is indicated by the arrow D.

The brake pads 16, 18 and the pressure plate 20 are guided and/or braced in shaft guides of the brake caliper 10 and/or the brake support 14. These can be installed or removed through the opening 12.

Figure 2:
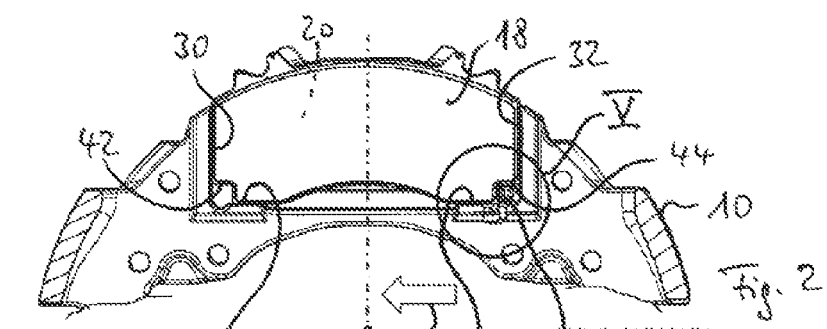

FIG. 2 shows the brake pad 18 at the application side with the pressure plate 20 behind it (broken line), both of them lying within an essentially U-shaped shaft guide.

Figure 3:
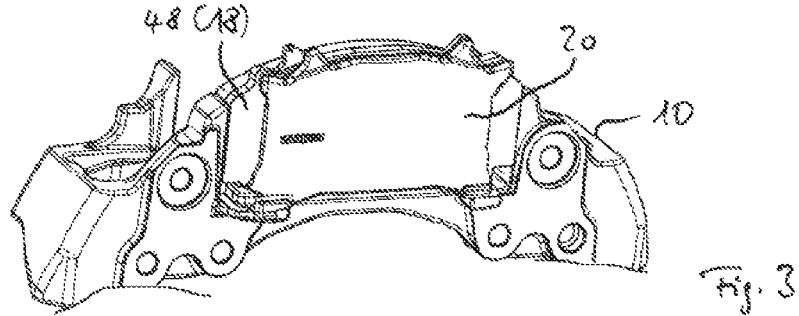
Figure 4:
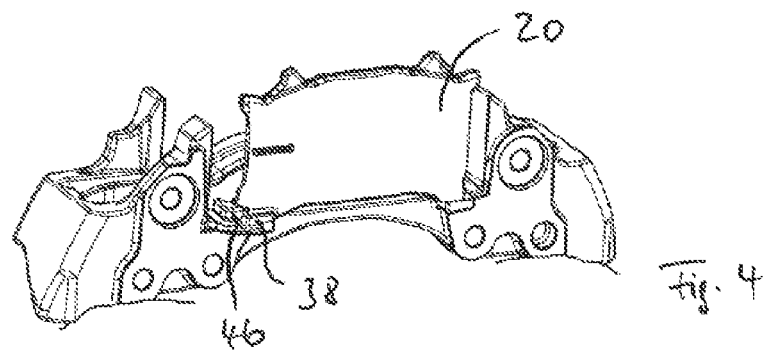

FIG. 3 shows a brake part with the guides for the pressure plate 20 and the brake pad in front of it from the application side. The brake pad 18 is wider than the pressure plate 20.

The shaft guides include braces 30, 32 acting in the circumferential direction and braces 34, 36 acting in the radial direction, both in terms of the brake axis A.

Radially on the inside the pressure plate 20 has a guide projection 38, which is guided in a guide slot 40 in the brake support 24. The guide slot 40 is tilted by an angle α relative to the brake axis A, so that it runs at a slant. Thus, there is an oblique guide for the pressure plate 20. The angle α should be chosen in consideration of the other circumstances. The oblique guide has substantial benefits. In this context, refer to EP 1 637 759 A1.

Figure 6:
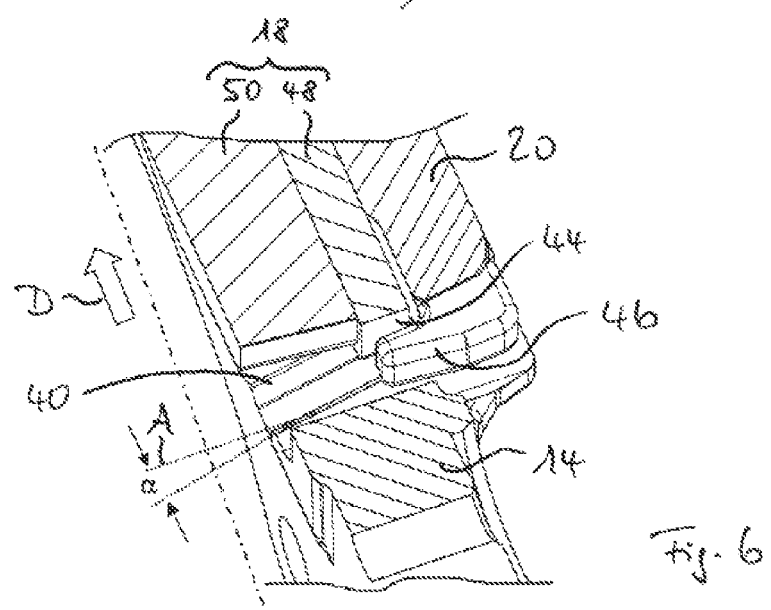

In the corners shown at lower right and lower left in FIG. 2, the brake pad 18 has a recess 42, 44. The recess 44 in the assembled state engages with a projection 46 formed on the pressure plate 20. As is especially evident in the sectional view of FIG. 6, the projection 46 is hook shaped in the sample embodiment depicted. As is also evident from the sectional representation of FIG. 6, the recess 44 is formed both on the back plate 48 and on the friction lining 50 of the brake pad 18, so that its depth is the same as or slightly greater than the thickness of the back plate 48. As a result, the hook-shaped projection 46 can still secure the brake pad 18 when the friction lining 50 is largely worn away. Of course, the length by which the hook-shaped projection 46 protrudes into the recess 44 must also be sufficient in this respect. This configuration according to the invention has the benefit that the hook-shaped projection sticking out from the pressure plate protrudes into the recess or cavity of the back plate, which does not lie in the region of the immediate contact surface of the pressure plate against the back plate, so that no pressure transmitting region of the pressure plate surface is lost. Furthermore, no material stresses can be created. This also holds, of course, for more than one projection or more than one recess in all the embodiments.

Figure 5:
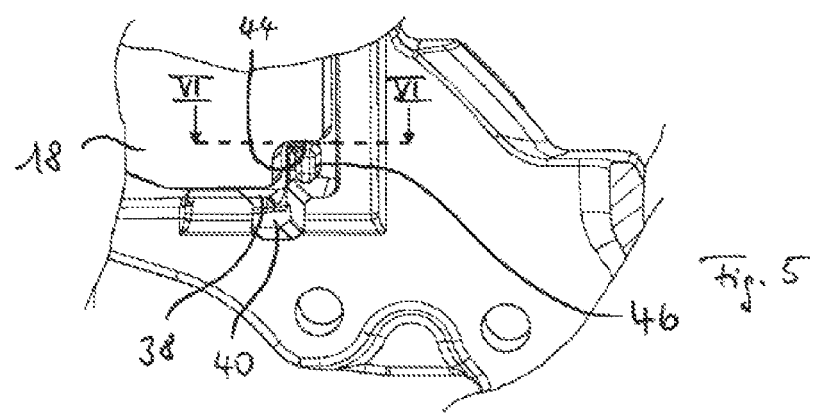

As is especially evident in FIGS. 2 and 5, the projection 46 engages in the recess 44 with a lateral play. This play is necessary in view of the fact that, because of the oblique guidance 38, 40, the pressure plate 20 moves parallel to the brake disk in regard to the brake pad 18, when the pressure plate 20 is moving together with the brake pad 18 in the direction of the brake disk during the braking process.

In the sample embodiment of FIGS. 1 to 6, the brake pad 18 is provided with two recesses 42, 44, while the pressure plate 40 has one projection 46. But the invention is not limited to this embodiment. Instead, a second projection can also be provided on the pressure plate 20, which for example engages with the recess 42. Several recesses and several projections can also be provided. The aforementioned coding can accordingly be realized by variation of the shapes, the number, and/or the positioning of the recesses and/or the projections.

Figure 7:
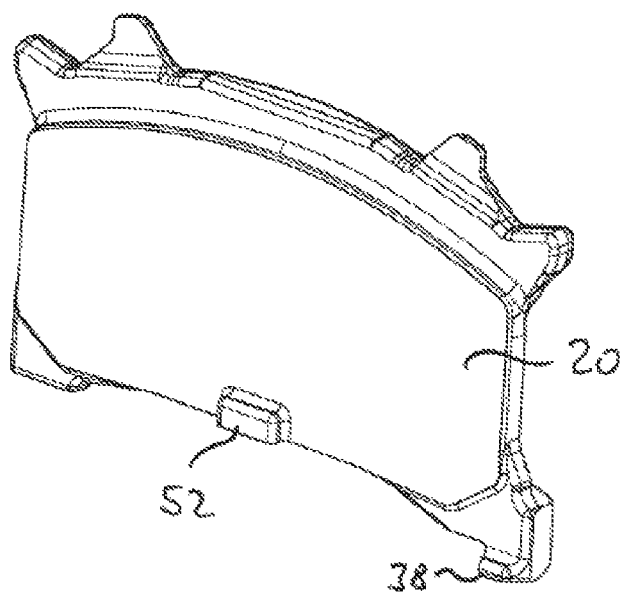
Figure 8:
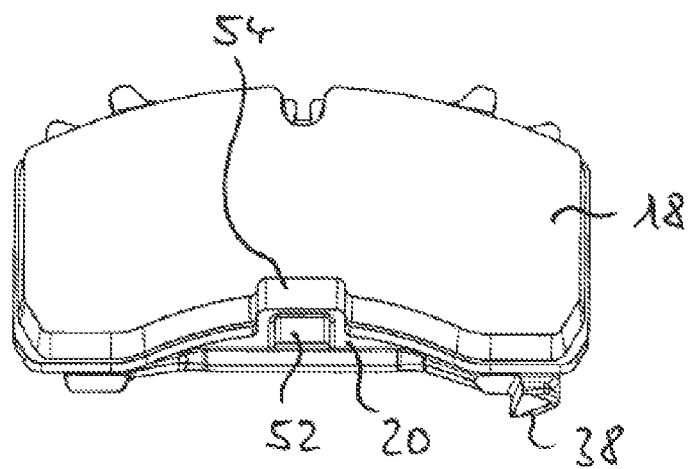
Figure 9:
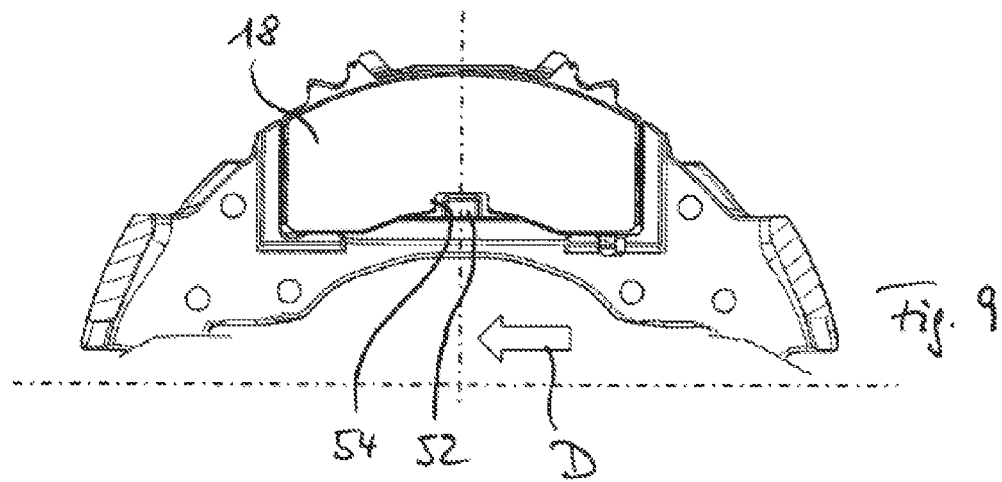

Another sample embodiment is shown in FIGS. 7 to 9. Here, the pressure plate 20 has a central projection 52, which engages with a recess 54 on the brake pad 18. As is especially evident in FIGS. 8 and 9, the projection 52 is accommodated in the recess 54 with play on both sides, in order to account for the relative movement of the oblique guide 38, 40.

The features of the invention disclosed in the above specification, the claims, and the drawing can be essential to the realization of the invention in its various embodiments, both individually and in any given combinations. Neither is the invention limited merely to the sliding caliper disk brake described in the sample embodiment, but also for other caliper designs, such as fixed or pendulum caliper disk brakes.

The invention claimed is:

1. A disk brake for commercial vehicles, comprising:
   a brake pad that includes a back plate and a brake lining,
   a brake application device for pressing the brake pad against a brake disk,
   a pressure plate by way of which the brake application device presses the brake pad against the brake disk during a braking process, wherein the pressure plate is disposed on a side of the back plate opposite to the brake lining, and
   wherein the pressure plate includes an inclined guide extending from the pressure plate toward the brake pad with the guide receivable within and moveable along a guide slot with the guide slot defining a path extending from the brake disk and lying obliquely to a brake axis during the braking process,
   wherein the pressure plate includes a projection extending towards the brake pad and the brake lining, and the back plate of the brake pad defines a recess which accommodates the projection in an assembled state, with a depth of the recess at least equal to a thickness of the back plate of the brake pad.

2. The disk brake according to claim 1, characterized by a play present between a side boundary of the projection and a corresponding interior boundary of the recess.

3. The disk brake according to claim 1, characterized in that the projection lies in a radially inward region of the pressure plate or the recess lies in a radially inward region of the brake pad.

4. The disk brake according to claim 1, characterized in that the projection is made as a single piece with the pressure plate.

5. The disk brake according to claim 1, characterized in that the pressure plate is a separate part of the disk brake.

6. The disk brake according to claim 1, wherein the projection is spaced from a center of the pressure plate such that the projection is located at an outer periphery of the pressure plate.

7. The disk brake according to claim 1, wherein the brake pad is wider than the pressure plate.

* * * * *